Oct. 21, 1941.    H. P. NELSON    2,260,047
METHOD OF AND MEANS FOR CLEANING AND TINNING SOLDERING TOOLS
Filed July 7, 1938
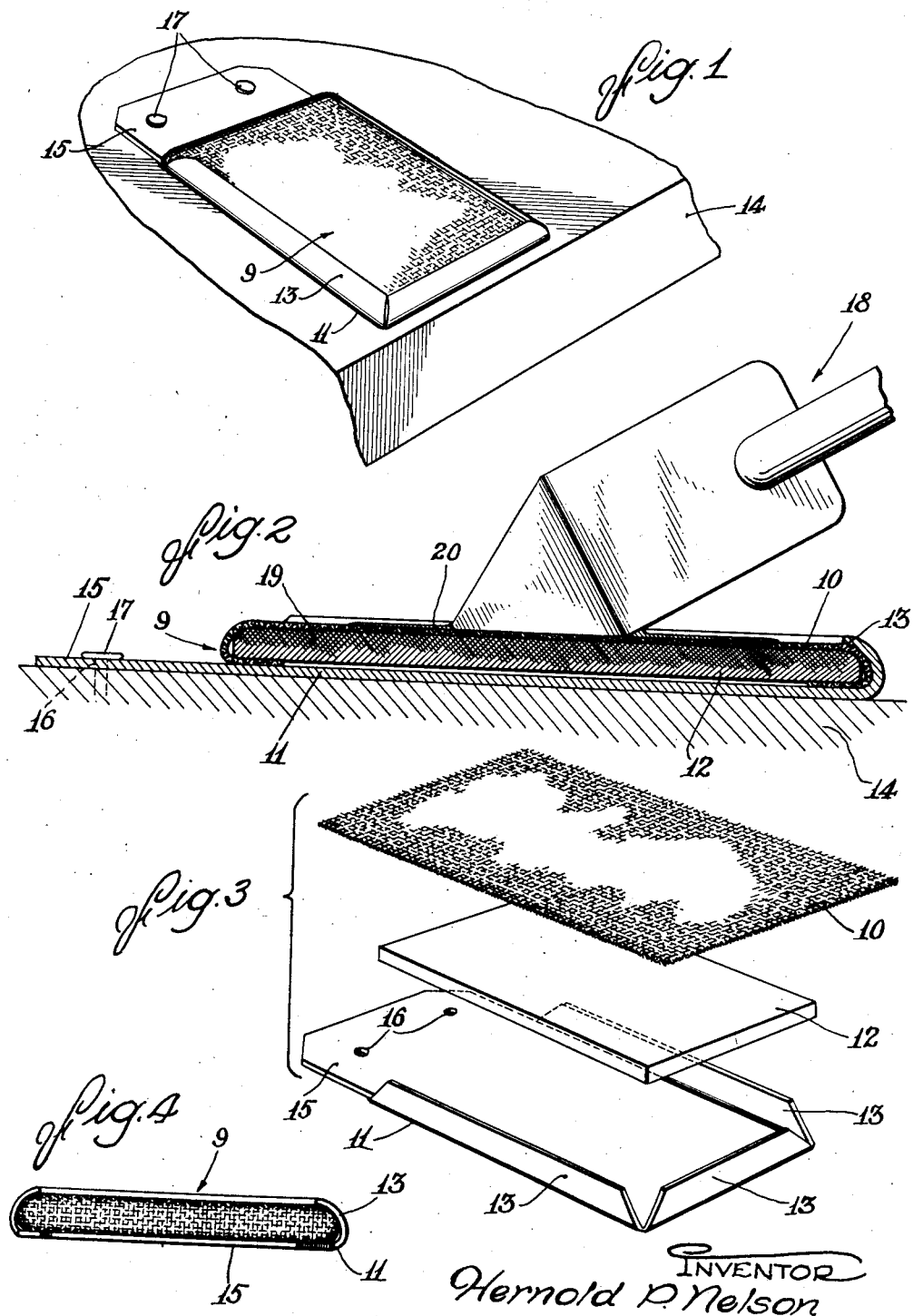

Patented Oct. 21, 1941

2,260,047

UNITED STATES PATENT OFFICE 2,260,047

METHOD OF AND MEANS FOR CLEANING AND TINNING SOLDERING TOOLS

Hernold P. Nelson, Chicago, Ill.

Application July 7, 1938, Serial No. 218,033

5 Claims. (Cl. 113—111)

This invention relates to a novel method of and means for cleaning and tinning soldering tools.

Soldering tools are customarily equipped with copper or copper alloy working heads or tips. In order to function properly the soldering surfaces of the tips must be kept free of oxide scale which forms rapidly thereon when unprotected due to the heat of the tool and exposure to the air. For the purpose of cleaning this oxide away, the soldering surfaces of the tools have in prior practice been ground or filed down at frequent intervals and the exposed surfaces thereafter "tinned" with a coating of solder to retard the oxidizing action. The frequency with which it is necessary to clean the soldering surfaces and the skill with which the cleaning is performed is therefore determinative of the period of usefulness of the tool because eventually the tip will be abraded away to the point of destruction.

The primary aim of the present invention is to reduce very substantially the waste and rapid destruction of soldering tools which has heretofore resulted from the grinding and filing thereof for cleaning purposes; and also to offer a new and refined soldering tool cleaning and tinning technic which is more efficient, simpler to practice and more economical than the crude method heretofore in vogue.

It is further an object of the invention to provide a novel method of and means for cleaning and tinning a soldering tool whereby the soldering surface of the tool can be renovated with great convenience, and without special preparation or substantial distraction from the working routine, merely by placing the soldering surface in pressure contact with a cleaning member and effecting relative movement between the surface and member.

Another object of the invention is to effect the cleaning of the working surfaces of soldering tools without grinding or filing.

Still another object of the invention is to provide a conditioning appliance upon which the working surface of a soldering tool can be cleaned and substantially simultaneously tinned.

An additional object of the invention is to provide such a conditioning appliance in which the flux and solder necessary for tinning the soldering surface of the soldering tool are carried in association with the cleaning element so that the identical motion by which cleaning of the soldering surface is effected will also effect a thorough tinning of the cleaned surface.

In this connection it is also an object of the invention to provide a conditioning appliance of this kind having means for maintaining a continuous, renewable supply of flux in association with the cleaning element.

Yet another object of the invention is to provide a conditioning appliance for the soldering surfaces of soldering tools which is of small, compact form so that it can be located at a convenient place in the field of soldering activity to be close at hand for frequent use and which is of inexpensive construction so that it may be made available at low cost.

Other objects and advantages will become apparent in the following description and from the accompanying drawing in which:

Figure 1 is a perspective view showing a device embodying the features of the invention.

Fig. 2 is a longitudinal sectional view through the device on an enlarged scale and showing a soldering tool in the process of being conditioned by the device.

Fig. 3 is an exploded assembly view of the device.

Fig. 4 is an end elevational view of the device looking from the attachment end thereof.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

My new cleaning and tinning technic comprehends, first, the cleaning of the working or soldering surface of a soldering tool to be conditioned. This I accomplish by effecting a rubbing action between the working surface and a mildly abrasive cleaning element. Good results have been obtained by rubbing the soldering surface upon a relatively rough or irregular metallic face such as that provided by a suitable wire mesh screen. Such a screen provides a large number of closely related nodules or prominences which, while they are not so sharp as to cut into the soldering surface of the tool, are yet abrupt and hard enough so that upon the application of reasonable pressure during the relative rubbing interaction, the oxide scale will be effectually stripped from the soldering surface.

The metal or alloy used for the cleaning element should be free of solder repelling properties because if some of the metal is transferred to the surface of the tool in the rubbing interaction during cleaning, the effect would be detrimental to the working efficiency of the tool. Moreover, such metallic substance should be resistant to the relatively prolonged heat to which it may be subjected by the soldering tool during the cleaning process. Bronze wire screening, for example, has been found in practice to be well suited for this purpose.

I have found also that the soldering surface of the tool can be effectively tinned coincident with the cleaning thereof. This result is attained by furnishing a supply of flux and solder to the cleaning element so that as quickly as the oxide scale is removed from the soldering surface, the cleaned surface is fluxed and coated with solder. Preferably, the flux is of the heat-liquefiable type such as rosin or a compound thereof which will be melted by the heat of the tool and will be distributed uniformly over the soldering surface being cleaned. Residual solder on the tool or solder supplied especially for the purpose is maintained in molten state by the tool heat and by the interaction of the heated soldering surface and the abrasive face of the cleaning element will be uniformly distributed over and worked onto the concurrently cleaned soldering surface.

As shown in the drawing, one practical form of cleaning and tinning appliance embodying the invention comprises a built up pad 9 including as a vital element a cleaning face provided herein by a suitable woven wire mesh screen member 10. This screen member is mounted in a suitable holder 11, herein constructed of sheet metal to resist the heat to which it may be subjected by the tools to be cleaned. Further protection against heat from the tools is provided by a heat insulating backing layer such as an asbestos pad 12 which is interposed between the cleaning screen member 10 and the body of the holder 11.

In one practical manner of constructing the appliance, the cleaning screen member 10 is dimensioned greater than the insulating pad 12 and the margins of the screen are folded about the edges of this pad to lie in assembly between the latter and the body of the holder 11. To hold the assembled screen and pad in place on the holder 11, the holder may be provided with marginal flanges 13 which are bent over to clamp the assembly in place.

In order to permit the device to be secured to a work bench 14 or the like, an extension or tab 15 is provided at one end of the holder 11. Perforations 16 may be formed in the tab 15 through which suitable tacks or nails 17 may be driven to hold the device in the desired position.

In using this device, the soldering surface of a soldering tool 18 to be cleaned is firmly pressed against and rubbed across the nodular cleaning face of the screen member 10. In the resulting interaction the mildly abrasive or scraping action of the metal prominences or humps of the screen face loosens and removes the oxide scale on the soldering surface of the tool without cutting into or roughening the surface. For the best results in cleaning, the tool should be at working heat because then the oxide scale is more readily separable. Moreover, less cleaning pressure will be required upon the tool; and, consequently, the screen member 10 will be saved from excessive wear.

Where during the cleaning action flux and solder are present on the cleaning face of the device, the soldering surface of the heated tool will be tinned. The loosened oxide scale or other impurity is repelled by the solder and can be wiped from the tinned soldering surface before the latter is used.

Flux may be furnished from a supply contained on the insulating pad 12. Thus, the insulating pad 12 may be saturated with flux as indicated at 19 in Fig. 2, and when the tool is brought in contact with the cleaning face, this flux will be melted. Pressure from the tool will cause the melted flux to exude through the screen into contact with the surface of the tool as shown at 20 (Fig. 2). Should the supply of flux become diminished through continued use, it can be replenished by placing a quantity of solid flux on the screen 10 and liquefying the same by bringing a hot soldering tool in contact therewith. In this manner the pad 12 will become resaturated.

The solder for tinning the cleaned surface of the soldering tool may be supplied to the device initially by placing a few drops upon the cleaning face of the screen prior to using the device and then working the solder over the screen as an incident to cleaning the hot soldering surface of the tool. Sometimes the solder remaining upon the tool after working therewith is sufficient to keep up the supply of tinning solder. If not, a few drops may be added from time to time. During periods of nonuse the face of the screen will hold the tinning solder in place. To avoid running off of the molten solder and flux, the cleaning appliance should preferably be supported substantially horizontally, face up as indicated in Figs. 1 and 2.

When the tool is removed from the device and the cleaned and tinned soldering surface is wiped off with a cloth it will show the effect of the conditioning process by a bright, uniformly silvery appearance.

If, just before the tool is allowed to cool off after use, the soldering surface thereof is conditioned as outlined, it will be clean and brightly tinned and ready for use when the tool is again heated. This preserves the soldering surface against oxidation in the interim.

In addition to the saving in time and energy by the use of the present method in cleaning and tinning soldering tools, there is a saving in flux and tinning solder and also a very substantial saving and increase in the useful life of the tools. Furthermore, the soldering surface of the tool will be saved from the deforming effect of improper or careless grinding or filing and can be maintained uniformly smooth and thoroughly tinned.

I claim as my invention:

1. A device for cleaning the soldering surface of a soldering tool comprising, in combination, a metallic cleaning screen, a holder, and an asbestos pad between said screen and said holder.

2. A device of the character described comprising, in combination, a cleaning screen member, a holder for said member, and a heat insulating pad between said screen member and said holder, said screen member having the margins thereof folded around the edges of said pad and interposed between said pad and the body of said holder.

3. A device of the character described, comprising, in combination, a cleaning member against which the soldering surface of a soldering tool may be rubbed, non-combustible heat insulating backing means for said member, and a sheet metal holder for said member including clamping flanges to connect the member and the backing means to the holder.

4. A device for cleaning the soldering tip of a soldering tool comprising, in combination, a relatively non-cutting wear and heat resistant cleaning face having the characteristics of a bronze screen including the nodular recticulated face thereof and affinity for solder, a non-combustible porous heat insulating pad forming a backing for said cleaning face, and means for connecting said cleaning face and backing pad into a unitary structure and for supporting the structure in a stationary face-up relationship upon a work bench or the like, the porosity of said pad enabling absorption thereby of flux to be exuded through said cleaning face upon the application of pressure to the latter incident to rubbing the soldering tip thereagainst in the cleaning process, said cleaning face being capable of retaining solder thereon to be liquefied by the heat of the tool during cleaning, whereby the surface of the soldering tip will be tinned coincident with cleaning thereof.

5. The method of cleaning and conditioning a soldering tool tip, which comprises placing a resistant nodular cleaning face in upwardly facing relation upon a supporting medium, placing a soldering surface of the tip at substantially working heat into pressure contact with the cleaning face, by the heat of the tip melting solder upon the cleaning face, and in the presence of the molten solder and flux effecting relative movement between the soldering surface and the cleaning face while maintaining the pressure contact so that the nodules of the cleaning face will dislodge oxide scale from the soldering surface for enabling the molten solder to immediately thereafter coat the scale-free areas of the soldering surface.

HERNOLD P. NELSON.